(12) United States Patent
Sugiyama et al.

(10) Patent No.: US 12,123,460 B2
(45) Date of Patent: Oct. 22, 2024

(54) POWER TRANSMISSION SHAFT

(71) Applicant: HITACHI AUTOMOTIVE SYSTEMS, LTD., Hitachinaka (JP)

(72) Inventors: Kenichi Sugiyama, Commerce Township, MI (US); Kenichiro Ishikura, Atsugi (JP)

(73) Assignee: HITACHI ASTEMO, LTD., Hitachinaka (JP)

(*) Notice: Subject to any disclaimer, the term of this patent is extended or adjusted under 35 U.S.C. 154(b) by 853 days.

(21) Appl. No.: 16/979,644

(22) PCT Filed: Jan. 28, 2019

(86) PCT No.: PCT/JP2019/002712
§ 371 (c)(1),
(2) Date: Sep. 10, 2020

(87) PCT Pub. No.: WO2019/181204
PCT Pub. Date: Sep. 26, 2019

(65) Prior Publication Data
US 2021/0040983 A1 Feb. 11, 2021

(30) Foreign Application Priority Data
Mar. 20, 2018 (JP) ................................ 2018-052078

(51) Int. Cl.
*F16C 3/02* (2006.01)
*B29C 70/24* (2006.01)
(Continued)

(52) U.S. Cl.
CPC .............. *F16C 3/026* (2013.01); *B29C 70/24* (2013.01); *F16C 3/023* (2013.01); *F16D 1/072* (2013.01);
(Continued)

(58) Field of Classification Search
CPC ...... F16C 3/026; F16C 3/023; F16C 2208/02; F16C 2326/06; B29C 70/24; F16D 1/072; B29K 2307/04; B29L 2031/75
(Continued)

(56) References Cited

U.S. PATENT DOCUMENTS 6,682,436 B2 * 1/2004 Kimoto .................. F16C 3/026
464/181
10,654,226 B2 * 5/2020 Ueda ...................... B29C 70/32

FOREIGN PATENT DOCUMENTS

JP 2003-001717 A 1/2003

OTHER PUBLICATIONS

Science Direct, "Carbon Fiber" retrieved from the Internet Jul. 19, 2023, retrieved at <www.sciencedirect.com/topics/chemical-engineeering/carbonfiber>. (Year: 2006).*

(Continued)

*Primary Examiner* — Greg Binda
(74) *Attorney, Agent, or Firm* — Foley & Lardner LLP

(57) ABSTRACT

A propeller shaft as a power transmission shaft includes a CFRP tube formed in a cylindrical shape as a shaft member, wherein a helical layer portion mainly bearing torsional strength and bending strength is made of carbon fiber of first carbon fiber material having a relatively high tensile strength (or a tensile elasticity), and wherein a hoop layer portion that is disposed at least one of inside and outside of the helical layer portion in a radial direction with respect to a rotational axis thereof and that does not bear torsional strength or bending strength is made of carbon fiber of second carbon fiber material having a tensile strength (or a tensile elasticity) lower than that of the first carbon fiber material.

5 Claims, 2 Drawing Sheets

(51) Int. Cl.
  *F16D 1/072*   (2006.01)
  *B29K 307/04*  (2006.01)
  *B29L 31/00*   (2006.01)
(52) U.S. Cl.
  CPC ....... *B29K 2307/04* (2013.01); *B29L 2031/75* (2013.01); *F16C 2208/02* (2013.01); *F16C 2326/06* (2013.01)
(58) Field of Classification Search
  USPC .......................................... 464/181; 428/36.9
  See application file for complete search history.

(56) References Cited

OTHER PUBLICATIONS

International Search Report issued in corresponding application No. PCT/JP2019/002712 dated May 7, 2019, with English translation.
Written Opinion issued in corresponding application No. PCT/JP2019/002712 dated May 7, 2019, with English translation.

\* cited by examiner

POWER TRANSMISSION SHAFT

TECHNICAL FIELD

The present invention relates to a power transmission shaft.

BACKGROUND ART

Patent Document 1 discloses a propeller shaft serving as a power transmission shaft employing a tube made of Carbon Fiber Reinforced Plastic (CFRP). The propeller shaft includes in its axial direction a first end to be connected to a transmission side via a first joint and a second end to be connected to a differential side via a second joint. Patent Document 1 discloses art for forming the CFRP tube as a lamination of a plurality of layers.

PRIOR ART DOCUMENT(S)

Patent Document(s)

Patent Document 1: JP 2003-001717 A

SUMMARY OF THE INVENTION

Problem(s) to be Solved by the Invention

However, the art disclosed in Patent Document 1 may suppress expansion in adoption of a propeller shaft employing CFRP due to increase in cost, because the laminated layers of the CFRP tube in Patent Document 1 are made of same grade (or same kind) of carbon fiber, i.e. carbon fiber same in tensile strength and tensile elasticity, and accordingly, carbon fiber with high strength and high elasticity is employed even for layers with no need for such high strength and high elasticity. In view of the foregoing, it is desirable to provide an inexpensive power transmission shaft employing a CFRP tube formed such that layers with no need for high strength and high elasticity are made of respectively low-priced carbon fiber with low to middle strength and low to middle elasticity.

Means for Solving the Problem(s)

According to an embodiment of the present invention, a power transmission shaft structured to be disposed between a first shaft and a second shaft that are a pair of shafts structured to be disposed between a drive source and a drive wheel of a vehicle includes a joint section that is disposed to face the first shaft, and includes a first joint and an insertion section. The first joint is disposed between the first shaft and the insertion section in a direction of a rotational axis of the first shaft. The power transmission shaft further includes a shaft member that is shaped tubular, and includes a helical layer part and a hoop layer part, and includes a first end and a second end in the direction of the rotational axis of the first shaft. The insertion section is inserted in the shaft member from the first end. The helical layer part includes a first resin material and a first carbon fiber material higher in tensile strength than the first resin material; the first carbon fiber material is impregnated with the first resin material, and is coiled helically around the rotational axis of the first shaft. The hoop layer part is disposed to overlap with the helical layer part in the direction of the rotational axis of the first shaft, and is disposed inside or outside the helical layer part in a radial direction with respect to the rotational axis of the first shaft. The hoop layer part includes a second resin material and a second carbon fiber material that is lower in tensile strength or tensile elasticity than the first carbon fiber material. The second carbon fiber material is impregnated with the second resin material, and is coiled circumferentially around the rotational axis of the first shaft.

Effect(s) of the Invention

The present invention serves to provide an inexpensive power transmission shaft.

MODE(S) FOR CARRYING OUT THE INVENTION

First Embodiment

Figure 1:
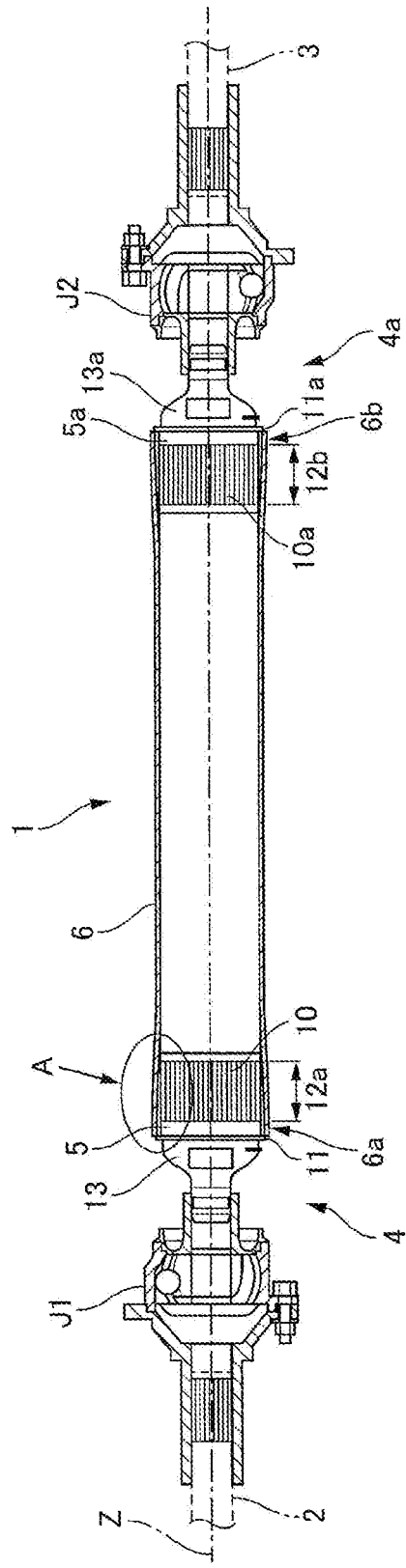
FIG. 1 is a whole view of a propeller shaft as an object for application of the present invention.

FIG. 1 is a whole view of a propeller shaft as an example according the present invention. For convenience, the following description refers to a left side in FIG. 1 as a vehicle front side, and a right side in FIG. 1 as a vehicle rear side. Furthermore, the following description refers to a direction along a rotational axis Z in FIG. 1 as an axial direction, and a direction around rotational axis Z as a circumferential direction.

Configurations of Propeller Shaft

Propeller shaft 1 serving as a power transmission shaft includes a joint section 4 and a joint section 4a. Joint section 4 includes a first constant-velocity joint J1, a collar 13, and an insertion section 5 including a serration 10, and is integrally rotatably connected with a first shaft 2 in the vehicle front side, wherein first shaft 2 is in coordination with a transmission connected to an engine not shown serving as a drive source. Joint section 4a includes a second constant-velocity joint 32, a collar 13a, and an insertion section 5a including a serration 10a, and is integrally rotatably connected with a second shaft 3 in the vehicle rear side, wherein second shaft 3 is in coordination with a differential connected to a drive wheel not shown. Insertion section 5 is press-fitted in a first end 6a of a CFRP tube 6 being a cylindrical tubular shaft member, and is fixed at a press-fit engagement section 12a due to serration 10. Similarly, insertion section 5a is press-fitted in a second end 6b of CFRP tube 6, and is fixed at a press-fit engagement section 12b due to serration 10a. Propeller shaft 1 further includes a flange 11 between insertion section 5 and collar 13, and a flange 11a between insertion section 5a and collar 13a. Flange 11 faces and is in contact with an end face of first end 6a of CFRP tube 6. Flange 11a faces and is in contact with an end face of second end 6b of CFRP tube 6. Thus-configured propeller shaft 1 is structured to establish power transmission between the transmission and the differential with an intersection angle therebetween, by virtue of first constant-velocity joint J1 and second constant-velocity joint J2.

Figure 2:
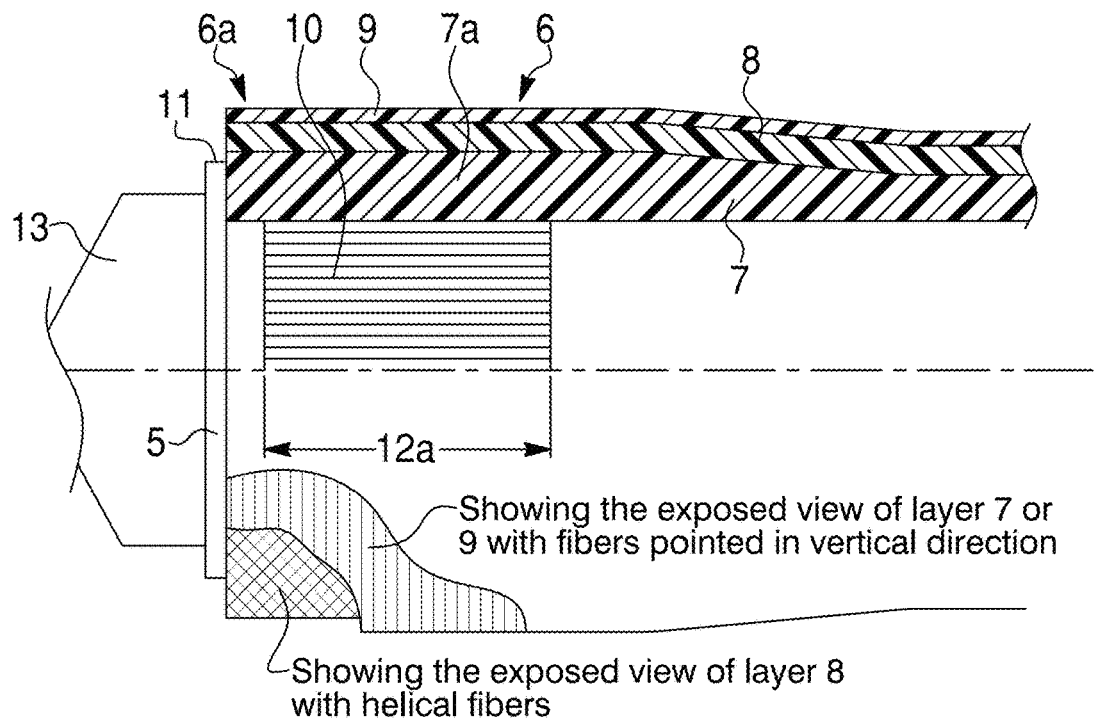
FIG. 2 is an enlarged view of a region A shown in FIG. 1, according to a first embodiment.

FIG. 2 is an enlarged view of a region A shown in FIG. 1, according to a first embodiment. First end 6*a* of CFRP tube 6 and its vicinity in the vehicle front side and second end 6*b* of CFRP tube 6 and its vicinity in the vehicle rear side are configured similarly to each other. Accordingly, for convenience, the following description focuses on first end 6*a* and its vicinity in the vehicle front side, i.e., focuses on the region A.

CFRP tube 6 is made of material called Carbon Fiber Reinforced Plastic (CFRP). CFRP tube 6 is generally produced by: impregnating carbon fibers with epoxy resin; coiling the carbon fibers around a mandrel to form a cylinder; and pulling out the mandrel after curing of the resin. The resin is desired to be one that cures relatively hard in order to enhance CFRP tube 6 in strength against torsion and bending in cooperation with the carbon fibers. CFRP tube 6 is composed of three layers: a first hoop layer part 7; a helical layer part 8 formed outside of first hoop layer part 7 in a radial direction with respect to rotational axis Z of first shaft 2; and a second hoop layer part 9 formed outside of helical layer part 8 in the radial direction.

Helical layer part 8 is a lamination of sublayers produced in view of a target torsion strength and a target bending strength by: impregnating first carbon fiber material with first resin material; and circumferentially coiling the first carbon fiber material at a torsion angle of 45 degrees maximum to helically extend in the axial direction and form the laminated sublayers, which is laminated with variation in torsion angle as appropriate in view of required performance. Thus-formed helical layer part 8 takes charge of torsion strength and bending strength of CFRP tube 6, and serves to achieve performance against torsion, bending, judder, etc., required upon use of propeller shaft 1 mounted in a vehicle.

Also the first hoop layer part 7 is a lamination of sublayers, wherein first hoop layer part 7 is disposed inside of helical layer part 8 in the radial direction with respect to rotational axis Z of first shaft 2 so as to overlap with helical layer part 8 in the axial direction. First hoop layer part 7 is produced by: impregnating second carbon fiber material with second resin material, wherein the second carbon fiber material is lower in tensile strength or tensile elasticity than the first carbon fiber material; and circumferentially coiling the second carbon fiber material to form the laminated sublayers. First hoop layer part 7 includes a thick section 7*a* formed thicker than helical layer part 8 and second hoop layer part 9 for enhancement of fit strength, wherein each of insertion section 5 including serration 10 and insertion section 5*a* including serration 10*a* is press-fitted and fixed in first hoop layer part 7.

Also the second hoop layer part 9 is a lamination of sublayers, wherein second hoop layer part 9 is disposed outside of helical layer part 8 in the radial direction with respect to rotational axis Z of first shaft 2 so as to overlap with helical layer part 8 in the axial direction. Second hoop layer part 9 is, similarly to first hoop layer part 7, produced by: impregnating the second carbon fiber material with the second resin material, wherein the second carbon fiber material is lower in tensile strength or tensile elasticity than the first carbon fiber material; and circumferentially coiling the second carbon fiber material to form the laminated sublayers. Second hoop layer part 9 tightens helical layer part 8 upon the coiling of second hoop layer part 9, which promotes the impregnation of the first carbon fiber material with the first resin material in helical layer part 8 while squeezing out an excess of the first resin material. This serves to improve helical layer part 8 in strength. The above tightening is performed with the second carbon fiber material made of carbon fiber. This serves to enhance press effect in the helical layer part in comparison with a case of coiling a tape. In addition, second hoop layer part 9 serves to protect CFRP tube 6 against chipping due to a small stone etc., in a state that propeller shaft 1 is mounted in a vehicle.

Insertion section 5 press-fitted in CFRP tube 6 is fixed on first hoop layer part 7 at press-fit engagement section 12*a*, due to serration 10 biting in first hoop layer part 7. In addition, as described above, flange 11 is disposed between insertion section 5 and collar 13 so as to face and be in contact with an end face of first hoop layer part 7 at first end 6*a* of CFRP tube 6.

First hoop layer part 7 facilitates destroy of first hoop layer part 7 by collar 13 upon vehicle collision, because first hoop layer part 7 is produced by circumferentially coiling the second carbon fiber material lower in tensile strength or tensile elasticity than the first carbon fiber material so as to form the lamination of sublayers. This serves to improve control performance on collision energy. Furthermore, flange 11 upon vehicle collision presses first hoop layer part 7 to cause separation at a boundary between first hoop layer part 7 and helical layer part 8, and facilitates entry of collar 13 into CFRP tube 6. This further serves to improve the control performance on collision energy.

The above configurations of CFRP tube 6 serves to provide CFRP tube 6 for propeller shaft having low-priced lamination structure, in which the second carbon fiber material low-priced and low or middle in strength and elasticity is employed for first hoop layer part 7 and second hoop layer part 9 neither of which takes charge of the torsion strength and the bending strength of CFRP tube 6 required for propeller shaft 1.

The following recites effects according to the first embodiment. (1) CFRP tube 6 being the cylindrical tubular shaft member is formed such that: helical layer part 8 mainly taking charge of the torsion strength and the bending strength is made of carbon fiber of the first carbon fiber material relatively high in tensile strength or tensile elasticity; and first hoop layer part 7 and second hoop layer part 9 neither of which takes charge of the torsion strength and the bending strength are made of carbon fiber of the second carbon fiber material lower in tensile strength or tensile elasticity than the first carbon fiber material, wherein at least one of first hoop layer part 7 and second hoop layer part 9 is disposed inside or outside of helical layer part 8 in the radial direction with respect to rotational axis Z. This allows the hoop layer part(s) to be made of relatively low-priced carbon fiber material, and thereby serves to reduce CFRP tube 6 for propeller shaft in cost.

(2) CFRP tube 6 being the cylindrical tubular shaft member is formed such that: helical layer part 8 mainly taking charge of the torsion strength and the bending strength is made of carbon fiber of the first carbon fiber material relatively high in tensile strength or tensile elasticity; and first hoop layer part 7 and second hoop layer part 9 neither of which takes charge of the torsion strength and the bending strength are made of carbon fiber of the second carbon fiber material lower in tensile strength or tensile elasticity than the first carbon fiber material, wherein first hoop layer part 7 and second hoop layer part 9 are disposed respectively inside and outside of helical layer part 8 in the radial direction with respect to rotational axis Z. This allows first hoop layer part 7 and second hoop layer part 9 to be made of relatively low-priced carbon fiber material, and thereby serves to further reduce CFRP tube 6 for propeller shaft in cost.

(3) First hoop layer part 7 made of carbon material relatively low in tensile strength or tensile elasticity is disposed in an inner circumferential side with respect to helical layer part 8. This facilitates the destroy of first hoop layer part 7 by collar 13 upon vehicle collision, and thereby improves the control performance on collision energy.

(4) Flange 11 is disposed between insertion section 5 and collar 13 so as to face and be in contact with an end face of first hoop layer part 7 at first end 6a of CFRP tube 6. Flange 11 upon vehicle collision presses first hoop layer part 7 to cause the separation at the boundary between first hoop layer part 7 and helical layer part 8, and thereby facilitates the entry of collar 13 into CFRP tube 6. This further serves to improve the control performance on collision energy.

(5) Second hoop layer part 9 made of carbon material relatively low in tensile strength or tensile elasticity is disposed in an outer circumferential side with respect to helical layer part 8. Second hoop layer part 9 tightens helical layer part 8 upon the coiling of second hoop layer part 9, which promotes the impregnation of the first carbon fiber material with the first resin material in helical layer part 8 while squeezing out an excess of the first resin material. This serves to improve helical layer part 8 in strength. The above tightening is performed with the second carbon fiber material made of carbon fiber. This serves to enhance the press effect in helical layer part 8 in comparison with a case of coiling a tape. In addition, second hoop layer part 9 serves to protect CFRP tube 6 against the chipping due to a small stone etc., in a state that propeller shaft 1 is mounted in a vehicle.

Second Embodiment

Figure 3:
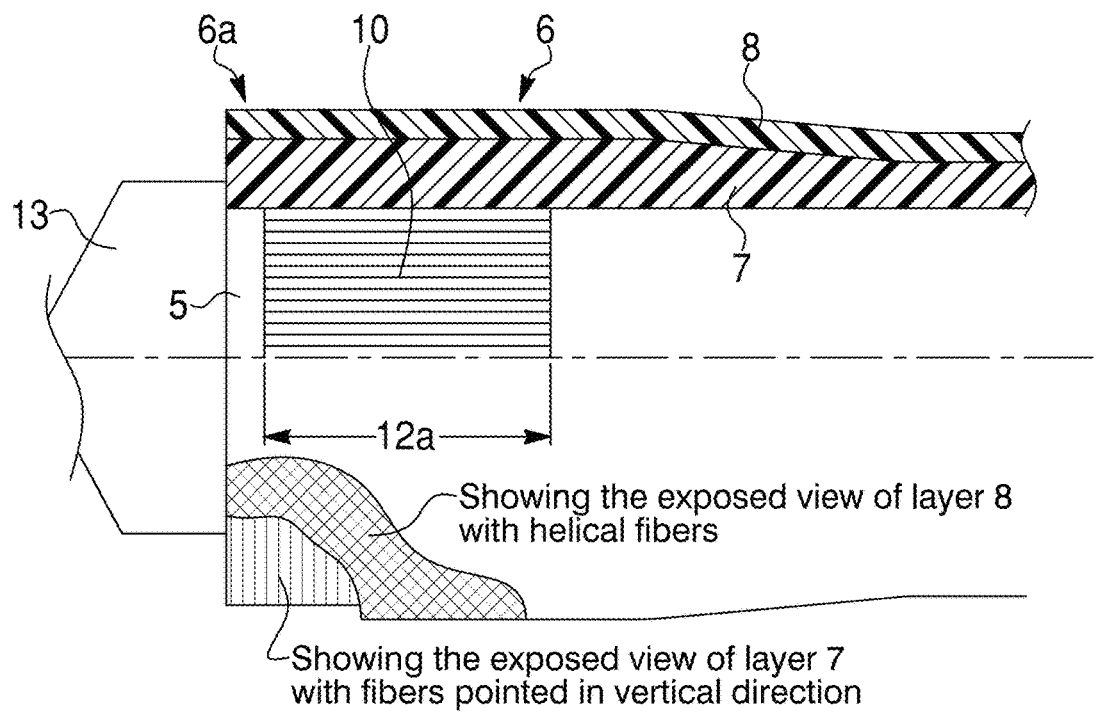
FIG. 3 is an enlarged view of a region corresponding to the region A shown in FIG. 1, according to a second embodiment.

FIG. 3 is an enlarged view of a region corresponding to the region A shown in FIG. 1, according to a second embodiment.

In contrast to the first embodiment, CFRP tube 6 is composed of merely helical layer part 8 and first hoop layer part 7 disposed inside of helical layer part 8 in the radial direction with respect to rotational axis Z, and no flange is disposed between insertion section 5 and collar 13. Other than that, the second embodiment is configured similarly to the first embodiment. The components common with the first embodiment are marked with the reference numerals same with the first embodiment to omit explanation thereof.

The following recites effects according to the second embodiment. (1) CFRP tube 6 being the cylindrical tubular shaft member is formed such that: helical layer part 8 mainly taking charge of the torsion strength and the bending strength is made of carbon fiber of the first carbon fiber material relatively high in tensile strength or tensile elasticity; and first hoop layer part 7 that does not take charge of the torsion strength and the bending strength are made of carbon fiber of the second carbon fiber material lower in tensile strength or tensile elasticity than the first carbon fiber material, wherein first hoop layer part 7 is disposed inside of helical layer part 8 in the radial direction with respect to rotational axis Z. This allows first hoop layer part 7 to be made of relatively low-priced carbon fiber material, and thereby serves to reduce CFRP tube 6 for propeller shaft in cost.

(2) First hoop layer part 7 made of carbon material relatively low in tensile strength or tensile elasticity is disposed inside of helical layer part 8 in the radial direction with respect to rotational axis Z. This facilitates the destroy of first hoop layer part 7 by collar 13 upon vehicle collision, and thereby improves the control performance on collision energy.

Other Embodiments

Although the above embodiments are described for carrying out the present invention, specific modes of the present invention are not limited to that according to the above embodiments. The above embodiments exemplifies CFRP tube 6 in which the hoop layer parts are disposed inside and outside of helical layer part 8 in the radial direction with respect to rotational axis Z (see FIG. 2), and CFRP tube 6 in which the hoop layer part is disposed merely inside of helical layer part 8 in the radial direction with respect to rotational axis Z (see FIG. 3). However, the present invention is not limited to that, and the hoop layer part may be disposed merely in the outer circumferential side with respect to helical layer part 8. Furthermore, the first resin material and the second resin material may be same material with each other, or may be different material from each other.

The following exemplifies technical ideas derivable from the embodiments described above. According to a first aspect, a power transmission shaft structured to be disposed between a first shaft and a second shaft that are a pair of shafts structured to be disposed between a drive source and a drive wheel of a vehicle includes a joint section that is disposed to face the first shaft, and includes a first joint and an insertion section. The first joint is disposed between the first shaft and the insertion section in a direction of a rotational axis of the first shaft. The power transmission shaft further includes a shaft member that is shaped tubular, and includes a helical layer part and a hoop layer part, and includes a first end and a second end in the direction of the rotational axis of the first shaft. The insertion section is inserted in the shaft member from the first end. The helical layer part includes a first resin material and a first carbon fiber material higher in tensile strength than the first resin material. The first carbon fiber material is impregnated with the first resin material, and is coiled helically around the rotational axis of the first shaft. The hoop layer part is disposed to overlap with the helical layer part in the direction of the rotational axis of the first shaft, and is disposed inside or outside the helical layer part in a radial direction with respect to the rotational axis of the first shaft. The hoop layer part includes a second resin material and a second carbon fiber material that is lower in tensile strength or tensile elasticity than the first carbon fiber material. The second carbon fiber material is impregnated with the second resin material, and is coiled circumferentially around the rotational axis of the first shaft. According to a further favorable aspect, in the first aspect above, the shaft member includes two of the hoop layer parts as first and second hoop layer parts. Furthermore, the first hoop layer part is disposed inside the helical layer part in the radial direction with respect to the rotational axis of the first shaft. Furthermore, the second hoop layer part is disposed outside the helical layer part in the radial direction with respect to the rotational axis of the first shaft. According to another favorable aspect, in the first aspect above, the hoop layer part is disposed inside the helical layer part in the radial direction with respect to the rotational axis of the first shaft. According to still another favorable aspect, in the first aspect above, the joint section includes a flange projecting outward in the radial direction with respect to the rotational axis of the first shaft. Furthermore, the flange is disposed to face the hoop layer part in the direction of the rotational axis of the first shaft, in a state that the insertion section is inserted in the shaft member. According to still another favorable aspect, in the first aspect above, the hoop layer part is disposed outside the helical layer part in the radial direction with respect to the rotational axis of the first shaft.

The invention claimed is:

1. A power transmission shaft structured to be disposed between a first shaft and a second shaft that are a pair of shafts structured to be disposed between a drive source and a drive wheel of a vehicle, the power transmission shaft comprising:
    a joint section that is disposed to face the first shaft, and includes a first joint and an insertion section, wherein the first joint is disposed between the first shaft and the insertion section in a direction of a rotational axis of the first shaft; and
    a shaft member that is shaped tubular, and includes a helical layer part and a hoop layer part, and includes a first end and a second end in the direction of the rotational axis of the first shaft, wherein the insertion section is inserted in the shaft member from the first end,
    wherein:
    the helical layer part includes a first resin material and a first carbon fiber material higher in tensile strength than the first resin material;
    the first carbon fiber material is impregnated with the first resin material, and is coiled helically around the rotational axis of the first shaft;
    the hoop layer part is disposed to overlap with the helical layer part in the direction of the rotational axis of the first shaft, and is disposed inside or outside the helical layer part in a radial direction with respect to the rotational axis of the first shaft;
    the hoop layer part includes a second resin material and a second carbon fiber material that is lower in tensile strength or tensile elasticity than the first carbon fiber material; and
    the second carbon fiber material is impregnated with the second resin material, and is coiled circumferentially around the rotational axis of the first shaft.

2. The power transmission shaft as claimed in claim 1, wherein:
    the shaft member includes two of the hoop layer parts as first and second hoop layer parts;
    the first hoop layer part is disposed inside the helical layer part in the radial direction with respect to the rotational axis of the first shaft; and
    the second hoop layer part is disposed outside the helical layer part in the radial direction with respect to the rotational axis of the first shaft.

3. The power transmission shaft as claimed in claim 1, wherein the hoop layer part is disposed inside the helical layer part in the radial direction with respect to the rotational axis of the first shaft.

4. The power transmission shaft as claimed in claim 1, wherein:
    the joint section includes a flange projecting outward in the radial direction with respect to the rotational axis of the first shaft; and
    the flange is disposed to face the hoop layer part in the direction of the rotational axis of the first shaft, in a state that the insertion section is inserted in the shaft member.

5. The power transmission shaft as claimed in claim 1, wherein the hoop layer part is disposed outside the helical layer part in the radial direction with respect to the rotational axis of the first shaft.

* * * * *